Aug. 18, 1925.
H. S. MYERS
POWER SHAFT CLUTCH FOR TRACTORS
Filed Aug. 5, 1922
1,550,563
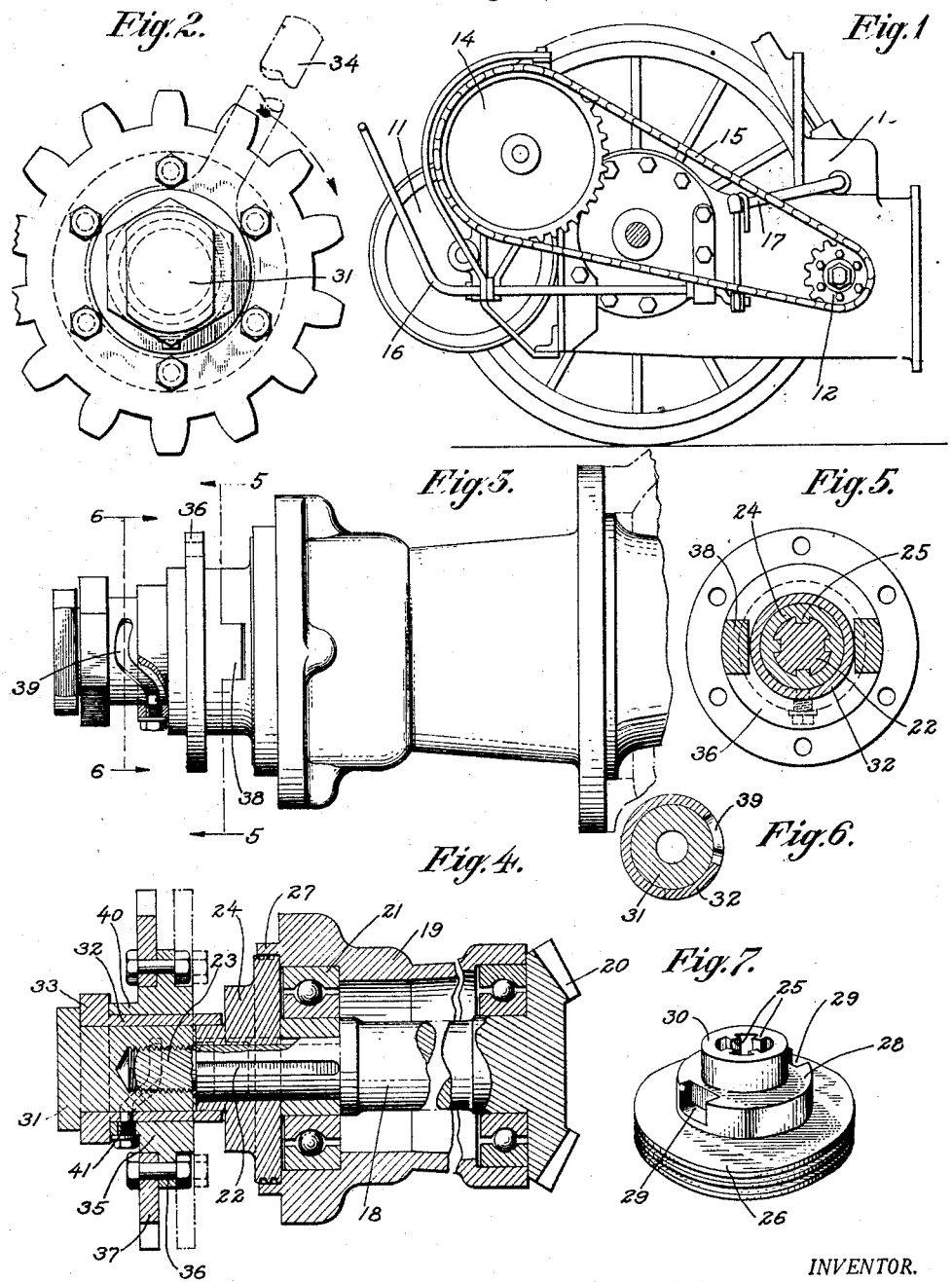
INVENTOR.
Harry S. Myers.
BY Wm. D. Shoemaker
ATTORNEY.

Patented Aug. 18, 1925.

1,550,563

UNITED STATES PATENT OFFICE.

HARRY S. MYERS, OF VAN, PENNSYLVANIA.

POWER-SHAFT CLUTCH FOR TRACTORS.

Application filed August 5, 1922. Serial No. 579,850.

*To all whom it may concern:*

Be it known that I, HARRY S. MYERS, a citizen of the United States, residing at Van, in the county of Venango and State of Pennsylvania, have invented certain new and useful Improvements in Power-Shaft Clutches for Tractors, of which the following is a specification.

This invention has relation to tractors and more particularly to an improvement in the power plant of such a tractor, which is utilized as a means for driving machinery other than the tractor itself. Tractors generally are provided with what is usually known as a "belt pulley shaft" which projects from the side of the tractor body and which is driven by the engine as long as it is running and the tractor clutch is engaged. It is desirable to provide means for arresting the movement of the drive element upon said "belt pulley shaft" at times, and particularly when transporting the tractor from place to place when it is not used as a stationary power plant. This is especially desirable when the tractor carries another machine which is driven from the "belt pulley shaft."

To accomplish this result, I have devised a special form of clutch to be made as a part of the "belt pulley shaft" assembly, and which enables the operative upon the simple turning of the parts by means of a suitable wrench to cause the belt pulley shaft to become inoperative as a drive element even though the engine is running and the tractor clutch engaged.

The particular adaptation which I have selected for the purpose of illustrating my invention is its use upon the Fordson tractor and I have shown in Figure 1 of the accompanying drawing a portion of such a tractor carrying upon the rear thereof a winch of my design, which is driven by a chain from the belt pulley shaft of the tractor. It will be appreciated that as long as the tractor is moving under its own power from place to place the main drive sprocket of the winch will be driven from the belt pulley shaft with the resultant danger to the operative of the tractor; this is avoided by my invention whereby the transmission element of the belt pulley shaft may be made inactive at will.

The object of the invention is the provision in a tractor power plant of means for making the belt pulley shaft inactive as a drive element whenever necessary or desirable. A further object of the invention is the production of a clutch for use with a belt pulley shaft of a tractor. A still further object of the invention is the production of a novel clutch mechanism. Other objects and advantages of the invention will hereinafter appear in the following description and the novel features thereof will be particularly pointed out in the appended claims.

Like reference numerals indicate like parts throughout the several figures of the drawing, in which Figure 1 is a side elevation of the rear end of a Fordson tractor with one of the drive wheels removed;

Figure 2 is an enlarged elevation of the end of the belt pulley shaft with the turning wrench in dot-and-dash lines;

Figure 3 is a side elevation of the end of the belt pulley shaft and housing;

Figure 4 is a vertical section through the device shown in Figure 3;

Figure 5 is a section upon the line 5—5 of Figure 3;

Figure 6 is a section upon the line 6—6 of Figure 3; and

Figure 7 is a perspective of one element of my clutch.

It will be appreciated that my invention may be embodied in various forms, and that the results sought may be accomplished by a variety of mechanisms. The form of the invention herein illustrated and described, therefore, is to be taken as indicative of the invention only. It is, however, a practical embodiment of my inventive ideas.

My improvement consists generally of a tractor comprising a power plant which may be used to transport the tractor or to drive machinery separate from the tractor, and means whereby that portion of the driving mechanism used in the transmission of power to the separate machinery may be made temporarily inactive. The tractor is indicated by the numeral 10 upon the drawings while the winch, selected as typical of machinery separate from the tractor, is indicated by the numeral 11. The belt pulley shaft 12 of the tractor drives the sprocket 14 through a chain 15. The machinery separate from the tractor is shown as mounted upon and carried by the tractor in its movements from place to place, and it will be appreciated that while the tractor is standing still with the engine running that the drive of the winch from the belt pulley shaft may be controlled through the medium of the extension clutch control 16, which causes the clutch pedal 17 to be depressed and the belt pulley shaft to be disconnected from the engine.

The drive shaft proper 18 is inclosed in the housing 19 which is mounted upon the side of the tractor body in a well known manner, bringing the beveled gear into mesh with parts of the power transmission mechanism of the tractor behind the clutch but in advance of the gear shift of the tractor. This arrangement of elements results in the capability of the tractor for use as a stationary power plant, by placing the gear shift in "neutral" and permitting the tractor clutch elements to be engaged, when the belt pulley or drive shaft 18 will be continuously driven as long as the engine is running. To stop the drive of the shaft 18 it is necessary to release the tractor clutch, but this is obviously impossible if it is desired that the tractor move from one place to another, and hence the drive shaft 18 must be continuously driven in such movement of the tractor. My invention makes it possible to disconnect the drive of machinery from the shaft 18 while the tractor is being transported from place to place.

In the outer end of the housing 19 there is provided a roller bearing 21 for the end of the shaft 18. The end of the shaft is fluted as at 22 and at its extremity it is provided with a reduced screwthreaded portion 23. Upon this fluted end, I have mounted a clutch element 24 which is shown detached in Figure 7. This clutch member is provided with interior flutes 25, which enable it to be mounted upon the fluted end 22 of the shaft 18 and to rotate therewith. This clutch element comprises a body portion 26 which lies within the recess formed by the flange 27 of the housing 19, a hub 28 in which are formed the clutch recesses 29, and a reduced end 30 which as hereinafter will appear forms a portion of a bearing for a sleeve member.

On the threaded end 23 of the shaft 18 is secured a steel subnut whose head has the shape shown in Figure 2, and whose body portion is cylindrical. The end 30 of the clutch member 24 and the cylindrical body of the subnut form a bearing surface for a sleeve 32 which is provided with an enlarged hexagonally shaped head, for the reception of the wrench 34 (see Figure 2) by means of which the sleeve may be turned upon the subnut 31 and clutch end 30.

Upon the sleeve 32 is the drive sprocket hub 35 which is capable of a sliding movement upon the sleeve as well as a partial rotative movement. This hub is provided with a circumferential flange 36, to which the drive sprocket 37 may be attached. As shown in full lines in Figure 4, it may be attached to the outer face of the flange 36, or as shown in dotted lines, it may be attached to the inner face of the flange. This hub is provided upon its inner face with clutch projections 38 shown best in Figure 3, which are adapted to lie in the recesses 29 of the clutch member 24, at which time the hub will be driven from the shaft 18 through the clutch element 24. This position of the parts is illustrated in Figure 3 of the drawing.

In Figure 4 of the drawing, the hub is removed from the clutch element 24, when the projections 38 are not in contact with the recesses 29, and in this position of the parts the drive sprocket 37 will be idle with respect to the shaft 18 and will with the sleeve 32 remain stationary with respect to subnut 31 and clutch end 30. It will be appreciated that the subnut will be held upon the shaft 18 by its screwthreaded engagement with the end 23 of said shaft; that the subnut will hold the sleeve 32 upon the clutch end 30; and that the sleeve and subnut will hold the clutch element 24 in its position upon the shaft 18 with its body 26 within the recess formed by the flange 27. In order to accomplish the shifting of the hub 35 upon the sleeve 32 to and from the clutch element 24, I have provided an angled slot 39 in the sleeve 32, and in the projecting collar portion 40 of the hub 35, I have provided a set screw 41 with a projecting end riding in the angled slot 39. It will be appreciated that by these means when the sleeve is turned through an angle of about 90 degrees with respect to the head, that the hub will be shifted toward and from the clutch member 24.

From the foregoing description the operation of my invention should be apparent. There remains only a résumé of the conjoint operation of the several parts to complete a full disclosure of the invention.

Suppose that the tractor, the rear end of which is shown in Figure 1, is standing and the engine thereof is being used as a power plant for the winch, shown as mounted upon the rear of the tractor. Power from the engine will be transmitted through the shaft 18 to sprocket 37, then through the chain 15 to winch sprocket 14. This power will be continuously applied unless the extension clutch control 16 of the tractor is depressed, when the shaft 18 will be disconnected from the engine.

If now it is desired to move the tractor to another place, it would be desirable to so disconnect the shaft 18 as to avoid any possibility of its driving the winch. This is particularly desirable when the winch itself is to be moved, but it is also desirable when the tractor is left standing in order that unauthorized persons may not start the tractor going and do damage to the winch. The result is accomplished by my invention by turning the sleeve 32 in the manner hereinbefore set forth so as to bring the clutch projections 38 of the hub 35 out of the clutch recesses 29 of the clutch element 24. This I do by means of a simple wrench as shown in Figure 2 of the drawing.

Having described my invention, what I claim as new and desire to secure by Letters Patent is—

1. In a power take-off from self-propelled motor vehicles, a shaft receiving power from the motor under control of the vehicle clutch but in advance of the gear shift, a clutch member keyed to said shaft, an elongated nut holding said clutch member upon said shaft, a sleeve rotatably mounted upon said nut, a power transmitting element slidably mounted upon said sleeve and provided with clutch projections, and means for sliding said power transmitting element upon said sleeve to bring said projections into engagement with said clutch member.

2. In a power take-off from self-propelled motor vehicles, a shaft receiving power from the motor under control of the vehicle clutch but in advance of the gear shift, a clutch member keyed to said shaft, an elongated nut upon the end of said shaft, a sleeve rotatably mounted upon said nut and clutch member, a power transmitting element slidably mounted upon said sleeve and provided with clutch projections, said nut constituting means for holding said sleeve, power transmitting element and clutch member upon said shaft, and means for sliding said power transmitting element upon said sleeve and clutch member end to engage and disengage said clutch projections with said clutch member, said means comprising an enlarged non-circular collar upon said sleeve, an angled slot in the sleeve body, and a projection from said power transmitting element travelling in said slot.

In testimony whereof I affix my signature.

HARRY S. MYERS.